United States Patent
Garay et al.

(10) Patent No.: US 10,830,053 B2
(45) Date of Patent: Nov. 10, 2020

(54) ENGINE COMPONENT COOLING HOLE

(71) Applicant: GENERAL ELECTRIC COMPANY, Schenectady, NY (US)

(72) Inventors: Gregory Terrence Garay, West Chester, OH (US); Zachary Daniel Webster, Mason, OH (US); Kirk D. Gallier, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 15/818,013

(22) Filed: Nov. 20, 2017

(65) Prior Publication Data

US 2019/0153870 A1 May 23, 2019

(51) Int. Cl.
*F01D 5/18* (2006.01)

(52) U.S. Cl.
CPC ........ *F01D 5/186* (2013.01); *F05D 2220/323* (2013.01); *F05D 2240/11* (2013.01); *F05D 2240/124* (2013.01); *F05D 2240/306* (2013.01); *F05D 2240/35* (2013.01); *F05D 2260/202* (2013.01)

(58) Field of Classification Search
CPC ................................ F01D 5/186; F01D 5/187
See application file for complete search history.

(56) References Cited

U.S. PATENT DOCUMENTS

| | | | |
|---|---|---|---|
| 4,347,037 A | 8/1982 | Corrigan | |
| 6,890,153 B2 * | 5/2005 | Demers | F01D 5/186 415/1 |
| 7,273,351 B2 | 9/2007 | Kopmels | |
| 7,306,026 B2 * | 12/2007 | Memmen | B22C 7/02 164/361 |
| 7,922,451 B1 | 4/2011 | Liang | |
| 7,997,868 B1 * | 8/2011 | Liang | F01D 5/186 416/97 R |
| 8,043,058 B1 | 10/2011 | Liang | |
| 8,092,176 B2 | 1/2012 | Liang | |
| 8,540,480 B2 | 9/2013 | Rawlinson | |
| 8,628,293 B2 | 1/2014 | Ramachandran et al. | |
| 8,753,083 B2 * | 6/2014 | Lacy | F01D 5/186 415/115 |
| 8,777,571 B1 | 7/2014 | Liang | |
| 9,156,114 B2 | 10/2015 | Pal et al. | |
| 2015/0146017 A1 | 5/2015 | Kim et al. | |
| 2016/0017724 A1 | 1/2016 | Xu | |
| 2016/0177738 A1 | 6/2016 | Moore et al. | |
| 2016/0201474 A1 | 7/2016 | Slavens et al. | |

* cited by examiner

*Primary Examiner* — J. Todd Newton
*Assistant Examiner* — Sabbir Hasan
(74) *Attorney, Agent, or Firm* — McGarry Bair PC (57) ABSTRACT

An apparatus and method regarding an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction, at least one cooling passage extending radially within the interior and defining a primary cooling airflow, and at least one cooling hole having an inlet in communication with the cooling passage and an outlet in communication with the exterior of the outer wall.

27 Claims, 8 Drawing Sheets

ENGINE COMPONENT COOLING HOLE

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil or blade, a platform and a dovetail mounting portion. The turbine blade assembly includes cooling inlet passages as part of serpentine circuits in the platform and blade used to cool the platform and blade. The cooling holes can originate within the serpentine circuits and terminate on any of the surfaces defining the blade.

BRIEF DESCRIPTION OF THE INVENTION

In one aspect, the present disclosure relates to an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction, at least one cooling passage extending radially within the interior and defining a primary cooling airflow, and at least one cooling hole having an inlet in communication with the cooling passage, an outlet in communication with the exterior of the outer wall, and a channel extending between the inlet and outlet and having a curvilinear centerline extending between the radial direction and the axial direction.

In another aspect, the present disclosure relates to an engine component for a turbine engine, the engine component comprising an outer wall defining an interior bound by a pressure side and a suction side extending axially between a leading edge and a trailing edge defining a chord-wise direction and extending radially between a root and a tip defining a span-wise direction, at least one cooling passage extending radially within the interior and defining a primary cooling airflow, and at least one cooling hole having an inlet in communication with the cooling passage, an outlet in communication with the exterior of the outer wall, and a channel extending between the inlet and outlet and having a curvilinear centerline extending between the radial direction and the axial direction.

In yet another aspect, the present disclosure relates to a method of cooling an airfoil having an outer wall defining an interior bound by a pressure side and a suction side extending axially between a leading edge and a trailing edge defining a chord-wise direction and extending radially between a root and a tip defining a span-wise direction, the method comprising flowing a cooling airflow through a cooling passage, directing a portion of the cooling airflow through an inlet of a cooling hole in a radial direction, turning the portion of the cooling airflow from one of a substantially radial direction or substantially axial direction to the other of a substantially axial direction or a substantially radial direction.

DETAILED DESCRIPTION OF THE INVENTION

Aspects of the disclosure described herein are directed to the formation of a curvilinear cooling hole defined by a channel extending between an inlet and an outlet where a centerline of the at least one cooling hole extends between a primarily radial direction to a primarily axial direction. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
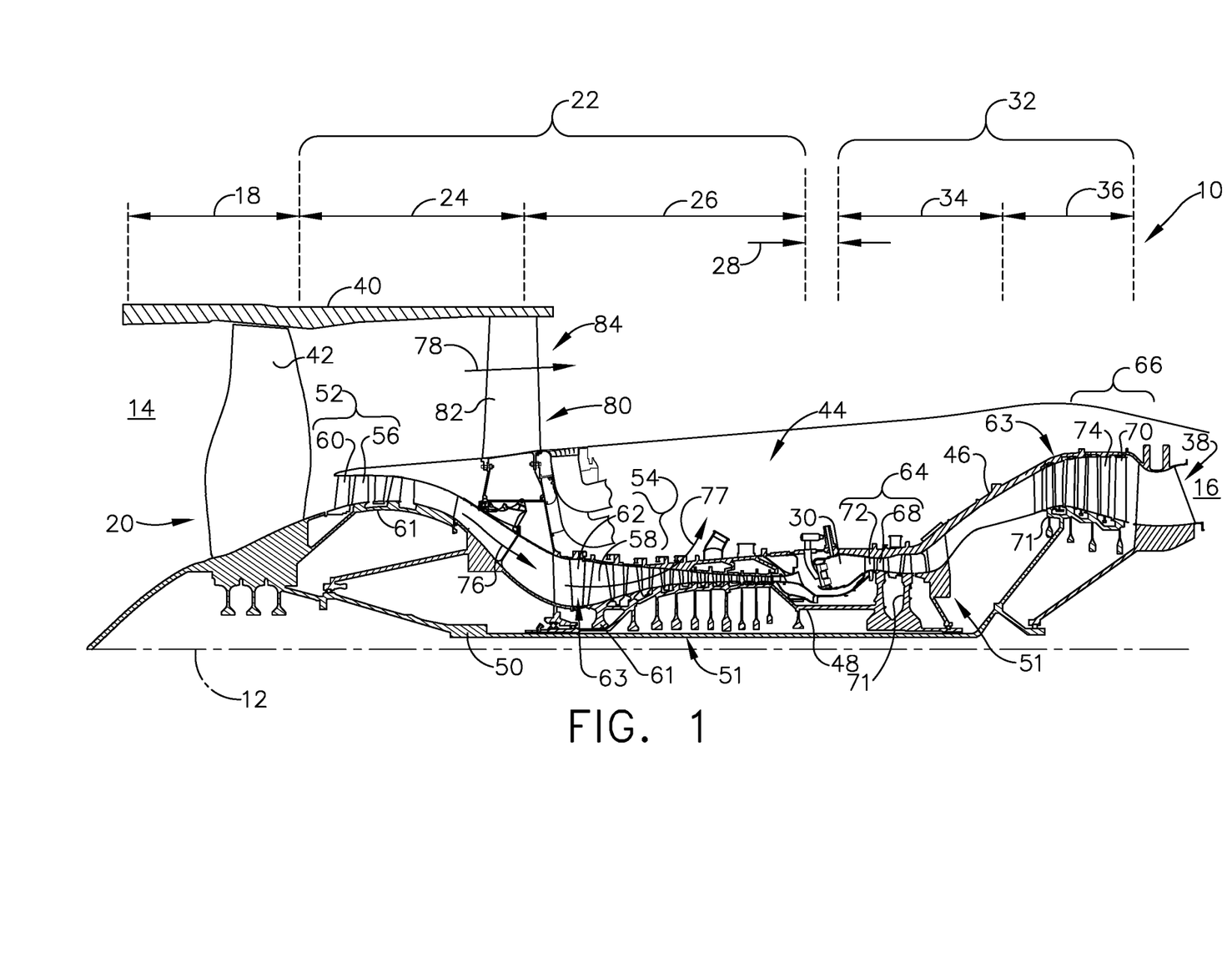
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
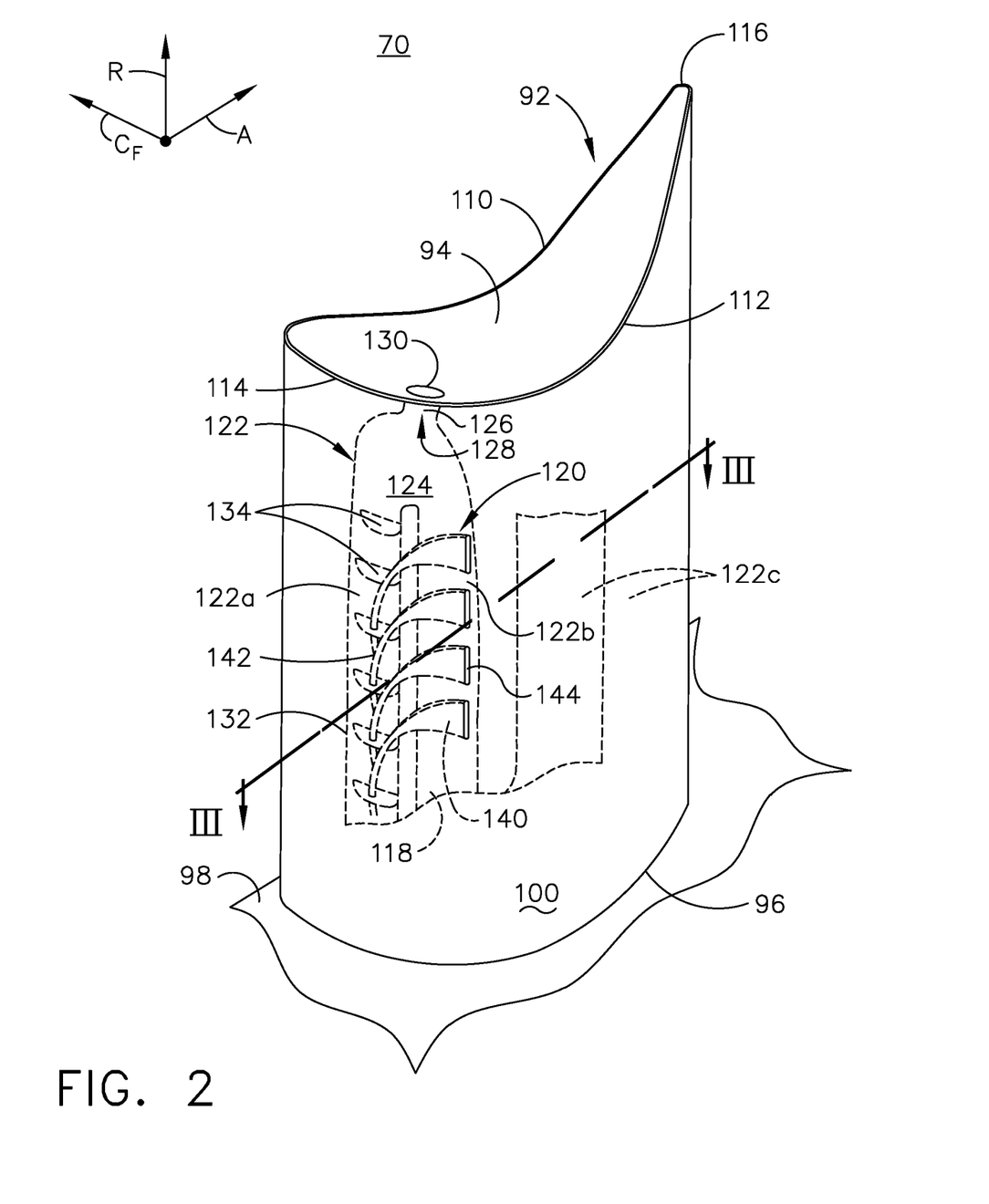
FIG. 2 is a perspective view of an airfoil illustrating interior components including at least one cooling hole and at least one cooling passage in phantom.

FIG. 2 is a perspective view of an engine component, by way of non-limiting example, the turbine blade 70 of the engine 10 from FIG. 1, showing interior components of the turbine blade 70 in phantom. Alternatively, the engine component can include a vane, a shroud, or a combustion liner in non-limiting examples, or any other engine component that can require or utilize cooling passages to cool portions of the engine component.

The turbine blade 70 defines an airfoil 92 extending radially between a tip 94 and a root 96 to define a span-wise direction. The airfoil 92 is mounted to a platform 98 at the root 96. The airfoil 92 includes a concave-shaped pressure side 110 and a convex-shaped suction side 112 which are joined together to define an airfoil shape extending axially between a leading edge 114 and a trailing edge 116 to define a chord-wise direction. The airfoil 92 has an interior 118 bound by an outer wall 100 and defined by the sides 110, 112. At least one cooling circuit 120 can be formed within the interior. The at least one cooling circuit 120 can include at least one cooling passage 122 extending radially within the interior 118. It should be understood that the interior 118 can include multiple cooling circuits and multiple cooling passages. In one non-limiting aspect of the disclosure discussed herein, investment casting can be utilized to manufacture the cooling circuit 120 by developing an investment casting core. In another aspect, direct metal manufacturing techniques can be utilized to manufacture the blade and cooling circuit.

The at least one cooling passage 122 can include a first cooling passage 122a and a second cooling passage 122b fluidly coupled to each other at a bend 124. A through-hole 126, by way of non-limiting example a cooling-hole, film-hole or dust-hole, can be provided at the bend 124 and extend between an inlet 128 and an outlet 130 at or proximate to the tip 94. While only one through-hole 126 is illustrated, it should be understood that multiple through-holes 126 fluidly coupled to one or more cooling passages are contemplated.

Interior walls 132 define the at least one cooling passage 122 and separate the first cooling passage 122a from the separate cooling passage 122b as well as from other cooling passages 122c illustrated in phantom. It should be understood that the cooling passages 122 as shown are for illustrative purposes only and are not meant to be limiting. At least one flow enhancer 134 is provided along the interior walls 132. The at least one flow enhancer 134 can be multiple flow enhancers 134 as illustrated and extend along the interior wall 132 in one of the first or second cooling passages 122a, 122b, by way of non-limiting example the first cooling passage 122a. By way of non-limiting example, the at least one flow enhancer 134 is a turbulator.

At least one cooling hole 140 has a cooling hole inlet 142 located within the first cooling passage 122a and a cooling hole outlet 144 located along the outer wall 100, by way of non-limiting example along the suction side 112 of the outer wall 100. It should be understood that the at least one cooling hole 140 as described herein can extend and have an outlet along the pressure side 110 as well. The at least one cooling hole 140 can be multiple cooling holes 140, by way of non-limiting example four cooling holes 140 as illustrated. The at least one cooling hole 140 extends from the cooling hole inlet 142 in a radial direction (R) and then curves toward the cooling hole outlet 144 in an axial direction (A). It is further contemplated that the cooling hole 140 can extend from the cooling hole inlet 142 in an axial direction (A) and then curve toward the cooling hole outlet in a radial direction (R), when, by way of non-limiting example, the cooling hole 140 is located in the tip 94 of the airfoil 70.

For purposes of description, the radial direction (R) is a direction perpendicular to and extending from the centerline 12. The axial direction (A) for purposes of illustration, is substantially perpendicular to the radial direction (R) and generally extends from the forward 14 portion of the engine 10 to the aft 16 portion of the engine. A third direction (Cf) for purposes of illustration, is substantially perpendicular to both the radial direction (R) and the axial direction (A) and circumscribes the centerline 12. It should be understood that the at least one cooling hole 140 can extend in each of these directions and can vary to some degree along these axes. For example, the airfoil 92 can lean up to 20 degrees from the radial direction (R) and the cooling holes 140 can lean up to 30 degrees from the axial direction (A) depending on the location of the cooling hole 140.

The amount of curvature can be a continuous arc with a constant radius, or a discontinuous arc having multiple radii. In at least one aspect of the disclosure herein the amount of curvature proximate the inlet 142, larger than the amount of curvature proximate the outlet 144. In other words, a tight curvature near the inlet 142 and more gradual curvature near the outlet 144.

Figure 3:
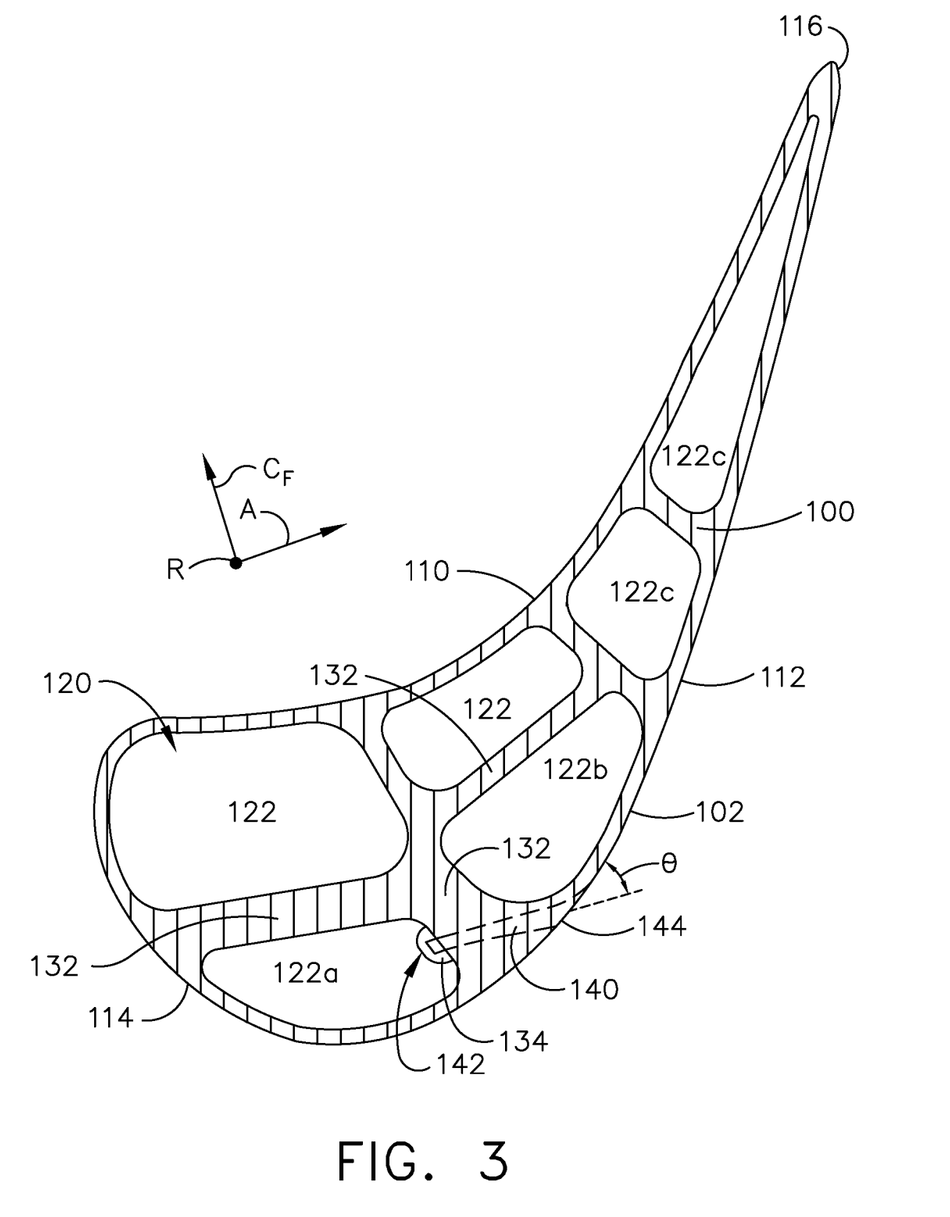
FIG. 3 is a cross-sectional view of the airfoil of FIG. 2 along line III-III.

Turning to FIG. 3 a cross-section of the airfoil 92 along line from FIG. 2 better illustrates the extension of the at least one cooling hole 140 in the axial direction (A). The at least one cooling hole 140 intersects the at least one flow enhancer 134 and extends out of the page in the radial direction (R) from the cooling hole inlet 142, located below the at least one flow enhancer 134, within the first cooling passage 122a then curves through the interior walls 132 in the axial direction (A) and terminates at the outer wall 100 along the suction side 112. A surface angle θ is formed between an exterior 102 of the outer wall and a curvilinear centerline (CL) of the at least one cooling hole 140. The surface angle θ is less than 40° and preferably less than 30°. As can more clearly be seen, the at least one cooling hole 140 extends from the first cooling passage 122a and in front of the second cooling passage 122b without intersecting the second cooling passage 122b. It should be understood that for the at least one cooling hole 140 to extend radially within the first cooling passage 122a to any extent, the thickness of the interior walls 132 may vary.

The directions described herein are for illustrative purposes and it should be understood that the cooling hole 140 as described herein curves from the radial direction (R) to another direction wherein the other direction can be anywhere in a perpendicular plane to the radial direction (R) by way of non-limiting example a plane of FIG. 3 stretching in both the axial direction (A) and the circumferential direction (Cf).

Figure 4:
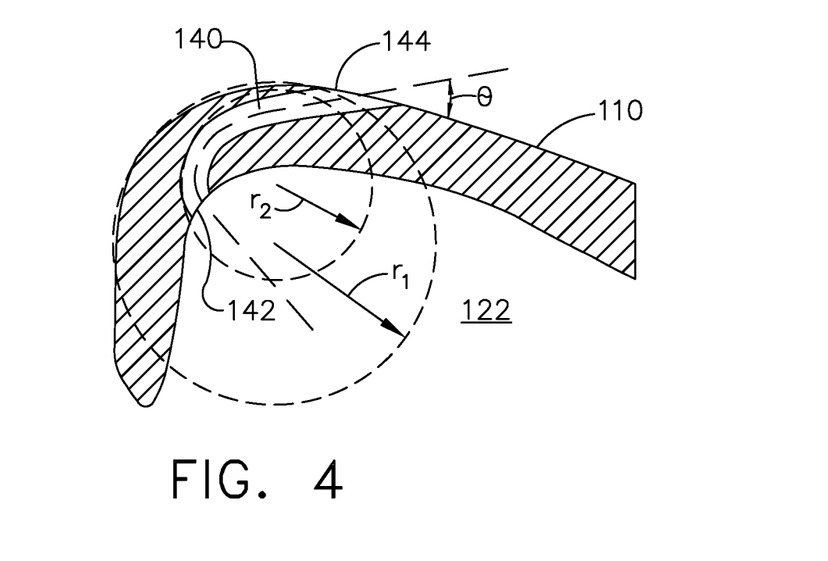
FIG. 4 is a cross-sectional view of the airfoil of FIG. 2 along an enlarged curved portion on a pressure side according to an aspect of the disclosure discussed herein.

FIG. 4 illustrates the at least one cooling hole 140 provided at a curved portion of the airfoil 92, by way of non-limiting example along the pressure side 110 and defined by a first radius ($r_1$). It is contemplated that the curvilinear centerline (CL) of the at least one cooling hole 140 can further extend in the circumferential direction (Cf) along a second radius ($r_2$) that is less than the first radius ($r_1$).

Figure 5:
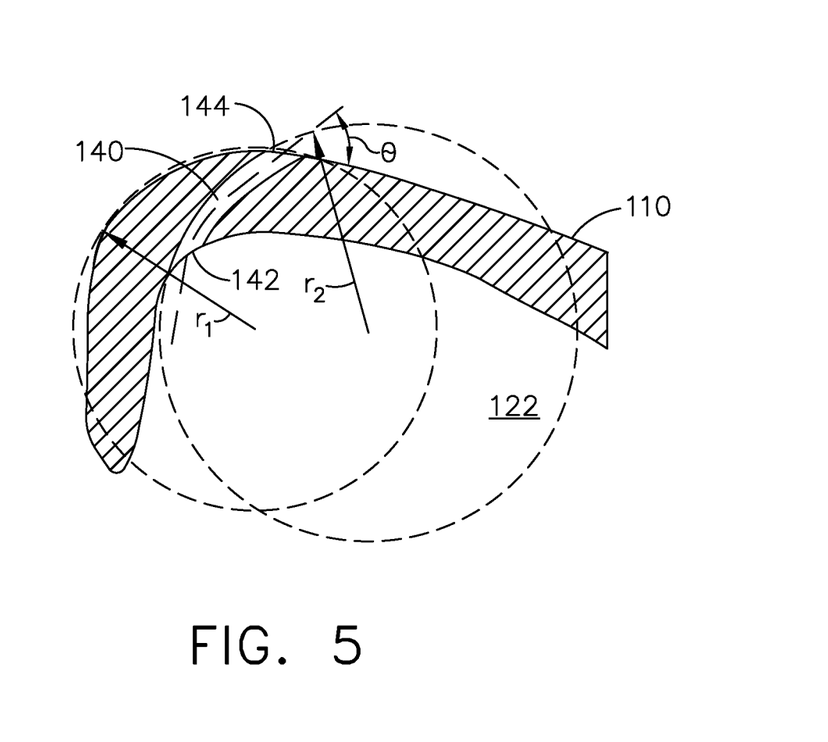
FIG. 5 is a cross-sectional view of the airfoil of FIG. 2 along an enlarged curved portion on a pressure side according to another aspect of the disclosure discussed herein.

FIG. 5 illustrates the at least one cooling hole 140 along the pressure side 110 defined by the first radius ($r_1$). It is further contemplated that the curvilinear centerline (CL) of the at least one cooling hole 140 can extend in the circumferential direction (Cf) along a second radius ($r_2$) that is greater than the first radius ($r_1$).

While illustrated in FIG. 4 and FIG. 5 as being located on the pressure side 110, it should be understood that the cooling hole 140 can be located anywhere along the outer wall 100 such that the cooling hole 140 extends along a curvilinear centerline (CL) in three dimensions. In this manner the cooling hole 140 can extend first in the radial direction (R), then in the axial direction (A) and then in the circumferential direction (Cf), or first in the radial direction (R), then in the circumferential direction (Cf), and then in the axial direction (A). In these aspects of the disclosure illustrated, the at least one cooling hole 140 can also extend first in the radial direction (R), then in both the axial direction (A) and the circumferential direction (CO to define a compound angle therebetween.

Figure 6:
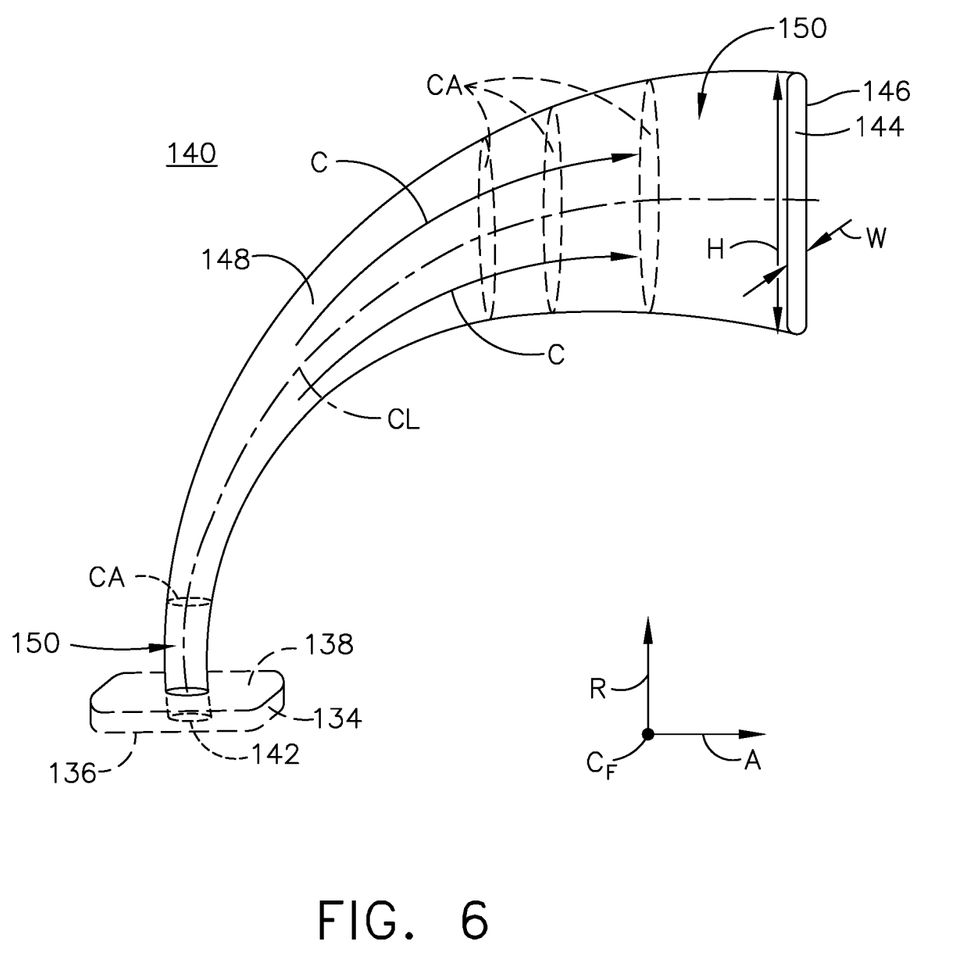
FIG. 6 is a perspective illustration of the at least one cooling hole from FIG. 2 according to an aspect of the disclosure discussed herein. For purposes of illustration, the cooling hole is shown as a solid in FIG. 4, which represents the void that is the cooling hole within the airfoil.

FIG. 6 illustrates the at least one cooling hole 140 in more detail. A channel 148 defines the at least one cooling hole 140 and extends from the cooling hole inlet 142 to the cooling hole outlet 144. The channel 148 can extend through the at least one flow enhancer 134 such that the cooling hole inlet 142 is flush with a flow facing side 136 of the flow enhancer 134. While illustrated as flush with the flow facing side 136 it is further contemplated that the cooling hole inlet 142 can be flush with a non-flow facing side 138. It is further contemplated that the at least one cooling hole 140 can include a metering section 150 located proximate the cooling hole inlet 142 and defined by a constant cross-sectional area (CA) of the channel 148. A diffusing section 152 can be located at the outlet 144 and be defined by an increasing cross-sectional area (CA) of the channel 148. The increasing cross-sectional area (CA) can be a continuously increasing cross-sectional area (CA) as illustrated. It is further contemplated that the entire channel 148 is a diffusing section 150.

A curvilinear centerline (CL) extends from the cooling hole inlet 142 to the cooling hole outlet 144. At the cooling hole inlet 142 the curvilinear centerline (CL) extends in the radial direction (R) while at the cooling hole outlet 144, the curvilinear centerline (CL) extends in the axial direction (A).

The cooling hole outlet 144 can define a height (H) and a width (W), wherein the height (H) extends in the radial direction (R) and the width (W) extends perpendicular to the height (H) along the outer wall 100. The width (W) can be substantially smaller than the height (H) such that the cooling hole outlet 144 is an elliptical shape 146. The diffusing section 152 therefore primarily diffuses cooling air (C) in a radial direction as illustrated. While illustrated as having an elliptical shape 146, the cooling hole outlets 144 as described herein can be any shape, including but not limited to a trapezoid, a laidback trapezoid, a square, a laidback square, an oval, a laidback oval, a fan, or a laidback fan shape.

Figure 7A:
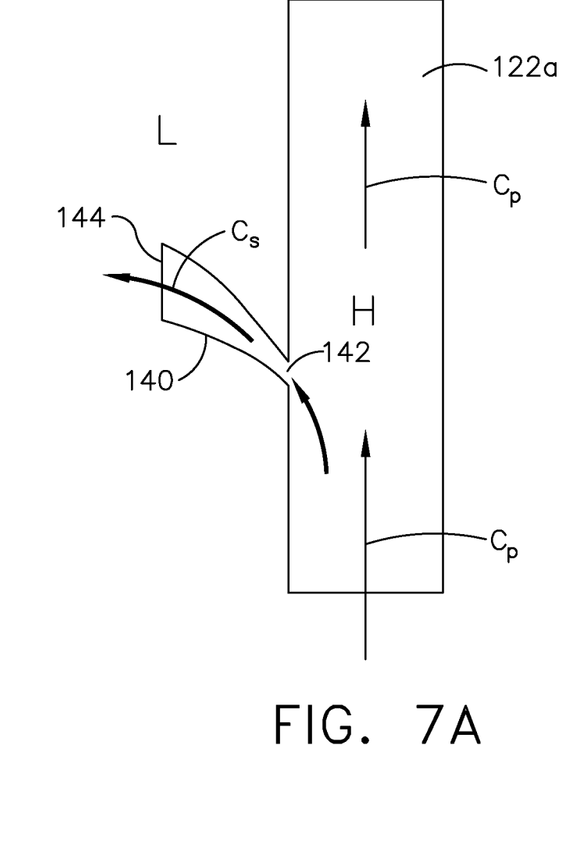
FIG. 7A is a schematic illustration of the at least one cooling passage defining a primary cooling airflow with the at least one cooling hole defining a secondary cooling airflow in the same direction as the primary cooling airflow.

Turning to FIG. 7A, a schematic representation of the first cooling passage 122a is illustrated with the at least one cooling hole 140 extending from the first cooling passage 122a such that the cooling hole inlet 142 is radially inward from the cooling hole outlet 144. The first cooling passage 122a defines a primary cooling airflow (Cp). The primary cooling airflow (Cp) can be, by way of non-limiting example, bleed air 77 redirected to cool the blades 70. The at least one cooling hole 140 can define a secondary cooling airflow (Cs) where the primary cooling airflow (Cp) and the secondary cooling airflow (Cs) are flowing in the same direction proximate the cooling hole inlet 142. Air flows from areas of relatively higher pressure (H) to areas of relatively lower pressure (L). With the at least one cooling hole oriented such that the primary cooling airflow (Cp) is in the same direction as the secondary cooling airflow (Cs) at the cooling hole inlet 142, the secondary cooling airflow (Cs) cools the outer wall 100 with minimal pressure losses between the first cooling passage 122a and the outer wall 100.

Figure 7B:
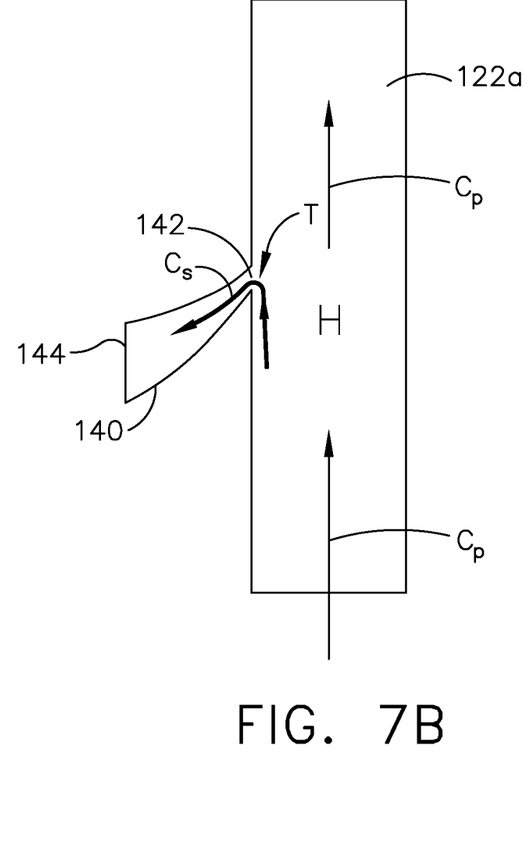
FIG. 7B is a schematic illustration of the at least one cooling passage defining a primary cooling airflow with the at least one cooling hole defining a secondary cooling airflow in the opposite direction as the primary cooling airflow.

Turning to FIG. 7B, it is further contemplated that the cooling hole inlet 142 is radially outward from the cooling hole outlet 144 such that the primary cooling airflow (Cp) flows in an opposite direction with respect to the secondary cooling airflow (Cs) proximate the cooling hole inlet 142. With the at least one cooling hole oriented such that the primary cooling airflow (Cp) is in the opposite direction as the secondary cooling airflow (Cs) at the cooling hole inlet 142, dust accumulation within the at least one cooling hole 140 is minimized since the dust will not make a turn (T) necessary to exit the cooling hole outlet 144 along the outer wall 100.

It is contemplated that the at least one cooling hole 140 can be multiple cooling holes oriented and arranged in any combination discussed herein to both minimize pressure losses and minimize dust accumulation and/or clogging. Examples of orientation and arrangements include but are not limited to arranging multiple cooling holes in a row with every other cooling hole inlet defining a secondary cooling airflow (Cs) in the same direction as the primary cooling airflow (Cp). It is further contemplated that a first row of cooling holes 140 can be oriented such that the primary cooling airflow (Cp) and the secondary cooling airflows (Cs) are in the same direction and that a second row of cooling holes 140 next to the first row of cooling holes can be arranged such that the primary cooling airflow (Cp) and the secondary cooling airflows (Cs) are in opposite directions. These examples are for illustrative purposes only and not meant to be limiting.

Figure 8:
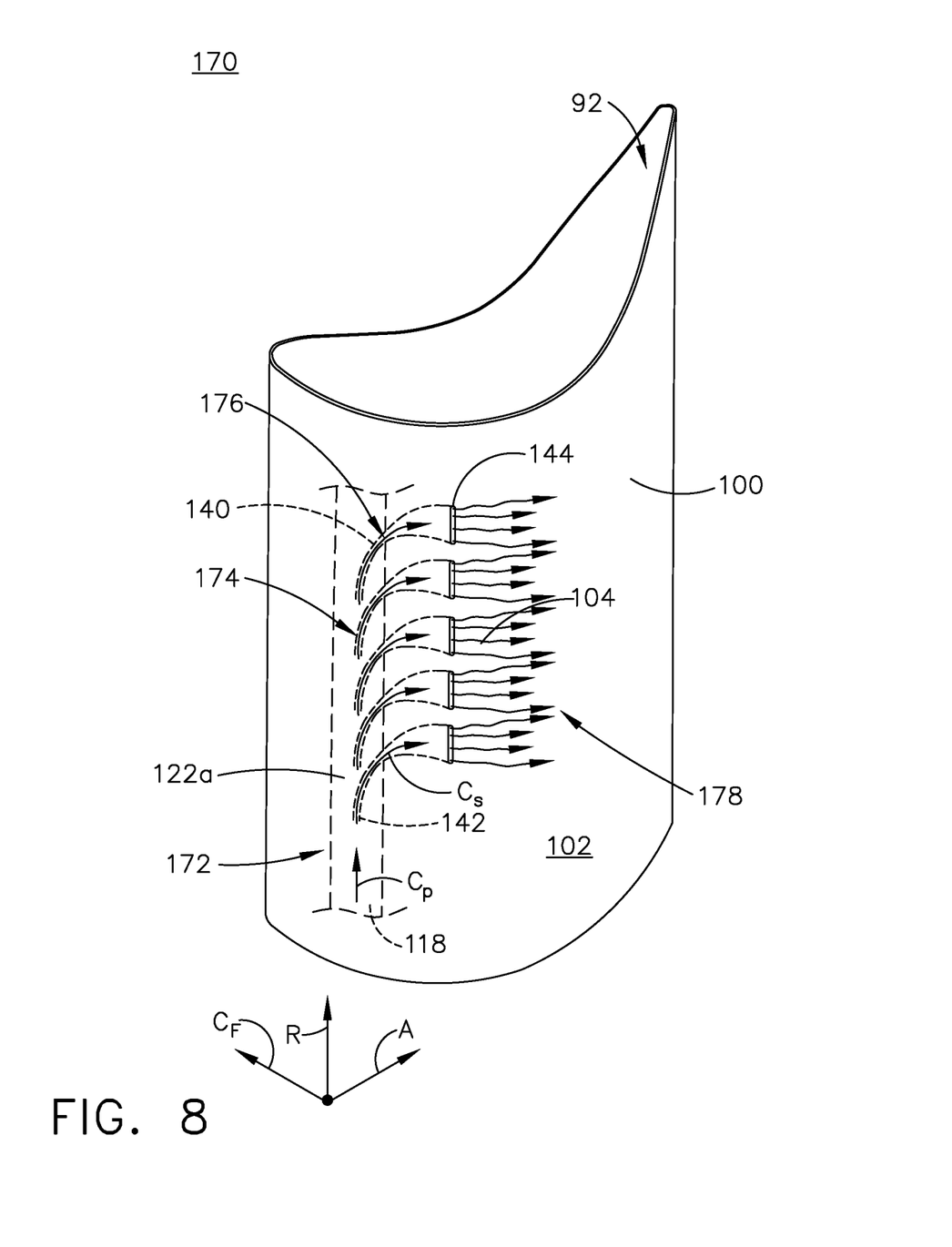
FIG. 8 is a perspective view of the airfoil of FIG. 2 illustrating a method of cooling the airfoil.

A method 170 of cooling the airfoil 92 is illustrated in FIG. 8. The method 170 includes as indicated by arrow 172, flowing a cooling airflow, by way of non-limiting example the primary cooling airflow (Cp), through a cooling passage 122, by way of non-limiting example the first cooling passage 122a. At arrow 174 a portion of the cooling airflow, by way of non-limiting example the secondary cooling airflow (Cs), is directed through the inlet 142 of the at least one cooling hole 140 in the radial direction (R). Then as indicated by arrow 176 the secondary cooling airflow (Cs) is turned from the radial direction (R) to the axial direction (A). It should be understood that the secondary cooling airflow (Cs) can first flow in a substantially radial direction (R) as described herein and then be turned towards a substantially axial direction (A) as described herein, where the radial direction (R) is perpendicular to the axial direction (A). Arrow 178 indicates that the secondary cooling airflow (Cs) is exhausted onto an exterior 102 of the outer wall 100 as a cooling film 104. It is further contemplated that the method 170 can include turning the secondary cooling airflow (Cp) to or from a substantially circumferential direction (Cf) as discussed herein.

Figure 9:
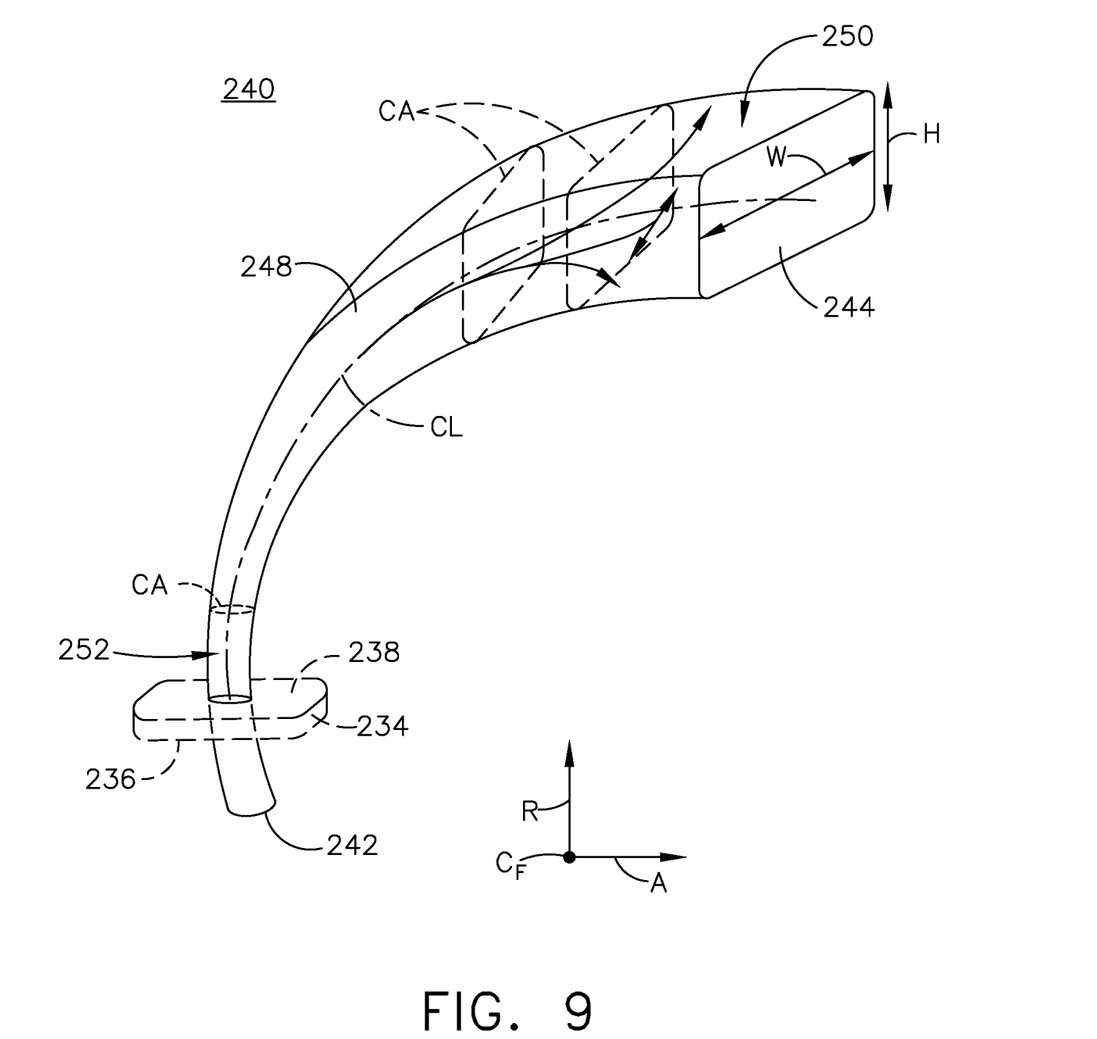
FIG. 9 is a perspective illustration of the at least one cooling hole from FIG. 2 according to another aspect of the disclosure discussed herein. For purposes of illustration, the cooling hole is shown as a solid in FIG. 7, which represents the void that is the cooling hole within the airfoil.

FIG. 9 is a cooling hole 240 according to another aspect of the disclosure discussed herein. The cooling hole 240 is substantially similar to the at least one cooling hole 140 of FIG. 6. Therefore, like parts will be identified with like numerals increased by 100, with it being understood that the description of the like parts of the at least one cooling hole 140 applies to the cooling hole 240 unless otherwise noted.

A channel 248 extends from a cooling hole inlet 242 to a cooling hole outlet 244. The channel 248 can extend through a flow enhancer 234 such that the cooling hole inlet 242 is located upstream of the flow enhancer 234 with respect to the flow of cooling air (C). It is contemplated that the at least one cooling hole 240 can include a metering section 250 located proximate the cooling hole inlet 242 and defined by a constant cross-sectional area (CA) of the channel 248. A diffusing section 250 can be located at the outlet 144 and be defined by an increasing cross-sectional area (CA) of the channel 248. The increasing cross-sectional area (CA) can be a continuously increasing cross-sectional area (CA) as illustrated. It is further contemplated that the entire channel 248 is a diffusing section 252. The metering section 250 and/or diffusing section 252 can be longer or shorter than illustrated depending on the implementation.

The cooling hole outlet 244 can define a height (H) and a width (W), wherein the height (H) extends in the radial direction (R) and the width (W) extends perpendicular to the height (H) along the outer wall 100. The width (W) can be larger than the height (H) as illustrated to define a rectangular shape.

By comparison, cooling air (C) flowing through the at least one cooling hole 240 can diffuse in two directions while cooling air flowing through the at least one cooling hole 140 (FIG. 6) diffuses primarily in one direction. Depending on implementation, different outlet shapes are contemplated. While illustrated as having a rectangular shape 246, the cooling hole outlets 244 as described herein can be any shape, including but not limited to a trapezoid, a laidback trapezoid, a square, a laidback square, an oval, a laidback oval, a fan, or a laidback fan shape.

Benefits associated with the description of the at least one cooling hole and passages as described herein include increased efficiency regarding cooling and an increase in dust mitigation. The curvilinear shape of the at least one cooling hole works in conjunction with the primary cooling airflow to promote complete filling of the cooling hole. The curvilinear shape of the cooling hole sets up an extension of length of the curvilinear centerline (CL) that when compared to a convention cooling hole enables longer/more diffusion and lower surface angles. Additionally the amount of curvature can be determined by the location of a turbulator, pin, or other flow enhancer for improved cooling and dust mitigation.

Additional technical advantages include a more stable diffusion through the cooling hole, a lower surface angle for more bore cooling and more persistent film, and optimal placement of a cooling hole inlet with respect to turbulators, pins, or other flow enhancers. With a better film performance there is less usage of air for cooling high pressure turbine components which is produce better engine specific fuel consumption.

It should be understood that any combination of the orientation and geometry related of the at least one cooling hole as described herein is contemplated. The varying aspects of the disclosure discussed herein are for illustrative purposes and not meant to be limiting.

Drilling, investment casting, 3-D printing, or additive manufacturing are exemplary methods of forming the cooling passages and cooling holes as described herein. It should be understood that other methods of forming the cooling passages and cooling holes described herein are also contemplated and that the methods disclosed are for exemplary purposes only.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall defining an interior bound by a pressure side and a suction side extending axially between a leading edge and a trailing edge defining a chord-wise direction and extending radially between a root and a tip defining a span-wise direction;
at least one cooling passage extending radially within the interior and defining a primary cooling airflow; and
at least one cooling hole having an inlet in communication with the cooling passage, an outlet in communication with an exterior of the outer wall, and a channel extending between the inlet and outlet and having a curvilinear centerline extending between the radial direction and the axial direction;
wherein the primary cooling airflow enters the inlet in a first direction and exits the outlet in a second direction perpendicular to the first direction, the cooling passage comprises at least one flow enhancer having a flow facing side facing the cooling airflow and a non-flow facing side, and the channel intersects with the at least one flow enhancer.

2. The airfoil of claim 1 wherein the at least one cooling hole comprises a diffusing section at the outlet.

3. The airfoil of claim 1 wherein the outlet has one dimension longer than another.

4. The airfoil of claim 1 wherein the inlet is located radially inward in the span-wise direction from the outlet.

5. The airfoil of claim 1 wherein the inlet is located radially outward in the span-wise direction from the outlet.

6. The airfoil of claim 1 wherein the at least one cooling hole defines a secondary cooling airflow.

7. The airfoil of claim 6 wherein a component of the primary cooling airflow and a component of the secondary cooling airflow are in opposite directions proximate the inlet.

8. The airfoil of claim 7 wherein the primary cooling airflow and the secondary cooling airflow are in the same direction proximate the inlet.

9. The airfoil of claim 1 wherein the inlet of the at least one cooling hole is located in the at least one flow enhancer.

10. The airfoil of claim 1 wherein the at least one cooling hole defines a secondary cooling airflow and the channel intersects the at least one flow enhancer such that the inlet is located upstream of the at least one flow enhancer with respect to the secondary cooling airflow.

11. The airfoil of claim 1 wherein the outlet is located along the suction side of the outer wall.

12. The airfoil of claim 1 wherein the curvilinear centerline forms a surface angle with the outer wall of less than or equal to 40°.

13. The airfoil of claim 1 wherein the curvilinear centerline forms a surface angle with the outer wall of less than or equal to 30°.

14. The airfoil of claim 1 wherein the curvilinear centerline further extends between the axial direction and a circumferential direction.

15. An engine component for a turbine engine, the engine component comprising:
an outer wall defining an interior bound by a pressure side and a suction side extending axially between a leading edge and a trailing edge defining a chord-wise direction and extending radially between a root and a tip defining a span-wise direction;
at least one cooling passage extending radially within the interior and defining a primary cooling airflow; and
at least one cooling hole having an inlet in communication with the cooling passage, an outlet in communication with an exterior of the outer wall, and a channel extending between the inlet and outlet and having a curvilinear centerline extending between the radial direction and the axial direction; and at least one flow enhancer having a flow facing side facing the primary cooling airflow and a non-flow facing side; wherein the channel intersects at least one of the flow facing side or the non-flow facing side.

16. The engine component of claim 15 wherein the at least one cooling hole comprises a diffusing section at the outlet.

17. The engine component of claim 15 wherein the at least one cooling hole defines a secondary cooling airflow.

18. The engine component of claim 17 wherein a component of the primary cooling airflow and a component of the secondary cooling airflow are in opposite directions proximate the inlet.

19. The engine component of claim 17 wherein a component of the primary cooling airflow and a component of the secondary cooling airflow are in the same direction proximate the inlet.

20. The engine component of claim 15 wherein the inlet of the at least one cooling hole is located in the at least one flow enhancer.

21. The engine component of claim 15 wherein the at least one cooling hole defines a secondary cooling airflow and the channel intersects the at least one flow enhancer such that the inlet is located upstream of the at least one flow enhancer with respect to the secondary cooling airflow.

22. The engine component of claim 15 wherein the curvilinear centerline forms a surface angle with the outer wall of less than or equal to 40°.

23. The engine component of claim 15 wherein the curvilinear centerline further extends between the axial direction and a circumferential direction.

24. A method of cooling an airfoil having an outer wall defining an interior bound by a pressure side and a suction side extending axially between a leading edge and a trailing edge defining a chord-wise direction and extending radially between a root and a tip defining a span-wise direction, the method comprising;

flowing a cooling airflow through a cooling passage within the airfoil;

directing a portion of the cooling airflow through an inlet of a cooling hole in a radial direction relative to the airfoil;

turning the portion of the cooling airflow from the radial direction to an axial direction; and exhausting the portion of the cooling airflow in the axial direction onto an exterior of the outer wall as a cooling film.

25. The method of claim 24 further comprising directing the portion of the cooling airflow through the inlet in the same direction as the cooling airflow in the cooling passage.

26. The method of claim 24 further comprising directing the portion of the cooling airflow through the inlet in an opposite direction with respect to the cooling airflow in the cooling passage.

27. The method of claim 24 further comprising turning the portion of the cooling airflow to or from a circumferential direction.

* * * * *